(12) United States Patent
Norrman

(10) Patent No.: US 7,363,907 B2
(45) Date of Patent: Apr. 29, 2008

(54) CONTROL DEVICE FOR A MOTOR VEHICLE

(76) Inventor: Jan Norrman, Ytterbyvik 3, Vaxholm (SE) SE-185 94

( * ) Notice: Subject to any disclaimer, the term of this patent is extended or adjusted under 35 U.S.C. 154(b) by 133 days.

(21) Appl. No.: 10/585,176

(22) PCT Filed: Dec. 22, 2004

(86) PCT No.: PCT/SE2004/001971

§ 371 (c)(1),
(2), (4) Date: Jun. 29, 2006

(87) PCT Pub. No.: WO2005/063558

PCT Pub. Date: Jul. 14, 2005

(65) Prior Publication Data

US 2007/0151543 A1    Jul. 5, 2007

(30) Foreign Application Priority Data

Dec. 30, 2003 (SE) .................................. 0303589

(51) Int. Cl.
*F02D 11/02* (2006.01)
*F02D 17/04* (2006.01)
(52) U.S. Cl. ............... 123/397; 123/400; 123/198 DC
(58) Field of Classification Search ............ 123/319, 123/395, 396, 397, 400, 198 DC
See application file for complete search history.

(56) References Cited

U.S. PATENT DOCUMENTS

| | | | | |
|---|---|---|---|---|
| 3,881,461 A | * | 5/1975 | Filip | .................. 123/198 DC |
| 4,213,513 A | * | 7/1980 | Beck | .................... 123/198 DC |
| 4,583,613 A | * | 4/1986 | Nakayama | ........... 123/198 DC |
| 5,092,295 A | * | 3/1992 | Kobayashi | ........... 123/198 DC |
| 6,363,911 B1 | * | 4/2002 | Reinhardt et al. | ........... 123/397 |
| 6,516,779 B2 | * | 2/2003 | Ikeda | ......................... 123/400 |

FOREIGN PATENT DOCUMENTS

WO    WO 97/28987    8/1997

OTHER PUBLICATIONS

International Search Report PCT/SE2004/001971, dated Mar. 17, 2005.

* cited by examiner

*Primary Examiner*—Erick Solis
(74) *Attorney, Agent, or Firm*—Ostrolenk, Faber, Gerb & Soffen

(57) ABSTRACT

An automotive vehicle, such as a motorcycle, has an electric ignition system for igniting fuel delivered to the engine of the vehicle, and a rotatable handle which the driver holds in one hand when driving the vehicle and rotates to control the power output of the engine between an idling end position and a high power end position. The device includes a switch for cutting out the ignition system temporarily. This is achieved by turning the handle towards and beyond a yieldable engine-idling abutment, by exerting a strong torque that exceeds a pre-chosen value.

8 Claims, 2 Drawing Sheets ns: 7,363,907 B2

CONTROL DEVICE FOR A MOTOR VEHICLE

CROSS REFERENCE TO RELATED APPLICATION

The present application is a 35 U.S.C. §§ 371 national phase conversion of PCT/SE2004/001971, filed 22 Dec. 2004, which claims priority of Swedish Patent Application No.0303589-6 filed Dec. 30, 2003 which is herein incorporated by reference. The PCT International Application was published in the English language.

BACKGROUND OF THE INVENTION

The present invention relates to a control device for an automotive vehicle that includes an internal combustion engine fitted with an electric ignition system, of the kind defined in the preamble of claim 1.

The present invention thus relates to a control device for an automotive vehicle that includes an engine fitted with an electric ignition system for delivering fuel to the engine combustion chamber, and a device for selectively setting the amount of air/fuel mixture delivered to the engine during running of the engine, wherein the control device includes a handle that can be gripped by one of the user's hand and that is adapted for rotation about an axis, wherein there is included a transmission means which functions to transfer the rotary movement of the handle to the air/fuel setting device, so that in a rotational end position of the handle the setting device will cause the engine to idle, and so that rotation of the handle from said end position in a first direction of rotation will cause the setting device to increase the flow of fuel to the engine. In the case of vehicles of the kind in question (motorcycles, snow scooters, and the like) the control handle is normally placed at one end of a control rod (the right end) and which is gripped by the driver's other hand at its other end.

There is, in practice, a certain risk that the engine of the vehicle concerned will remain set to a high number of revolutions or a to high power output despite the driver having turned the control handle (the gasoline supply handle) to said engine idling position when the driver considers that the speed of the vehicle is too high in respect of the ongoing driving situation or when the driver considers that a risk situation has suddenly occurred.

The gasoline supply handle is normally connected to a transmission that comprises, for instance, one or two Bowden-cables leading to the carburator (or the like) of the engine. The malfunction indicated above can occur, for instance, when the cable breaks and seizes-up in its sheath or when the carburator jet needle fastens in an open position.

In this regard it is known to connect in the engine ignition system a change-over switch, which is placed in the proximity of the gasoline supply handle so as to enable, when necessary, the driver to actuate the switch with one finger, for instance the thumb, of the hand with which the handle is gripped, so as to shut down the engine ignition system, thereby, for instance, preventing sparking of the engine spark plugs, resulting in immediate stoppage or killing of the engine.

Because the aforesaid malfunction occurs so seldom (particularly in connection with a traffic situation in which the consequences may be serious) the driver who experiences an acute danger situation has no ingrained pattern of action that causes him/her to press the switch immediately he/she notices the malfunction in question. The correct procedure (actuation of the kill button) will therefore normally be undertaken too late to result in any substantial reduction in the consequences of the event.

Accordingly, one object of the present invention is to provide a control device which enables the driver of the vehicle to switch off the ignition system more quickly in a risk situation, so as to cut or kill the engine temporarily more quickly and therewith greatly reduce the consequences.

SUMMARY OF THE INVENTION

This object is achieved by means of the invention. The invention is defined in the accompanying claim 1.

Further embodiments of the invention will be apparent from the accompanying dependent claims. A rotatable control handle/gasoline supply handle of the kind in question normally has a turn-back end position that defines the engine idling position according to one important feature of the invention, the control device is adapted to enable the handle to be turned back beyond its end position while overcoming a pre-determined turning resistance wherein a switch for temporarily shutting down the engine ignition system is activated by turning the handle back beyond the idling position. A driver may feel a pressing need to turn the handle quickly back to the engine idling position during his/her journey, for instance immediately prior to reaching the brow of a hill where the vehicle may travel relatively far through the air with the subsequent risk of the driver and the vehicle toppling and falling off the road, although if a malfunction of the aforesaid kind occurs at precisely this moment the normal reflex of the driver causes the handle to be turned towards the idling position more powerfully than the force usually applied in returning the handle to the engine idling position. The handle is typically biased towards the idling position with the aid of a spring device and when the handle is turned manually towards the idling end position this is effected with a force which, in normal traffic situations/risk situations, is substantially smaller than the greater turning resistance of the handle back beyond the idling position for switch activation, said greater force being set in accordance with the invention.

BRIEF DESCRIPTION OF THE DRAWINGS

The invention will now be described by way of example with reference to the accompanying drawing.

DESCRIPTION OF A PREFERRED EMBODIMENT

Figure 1:
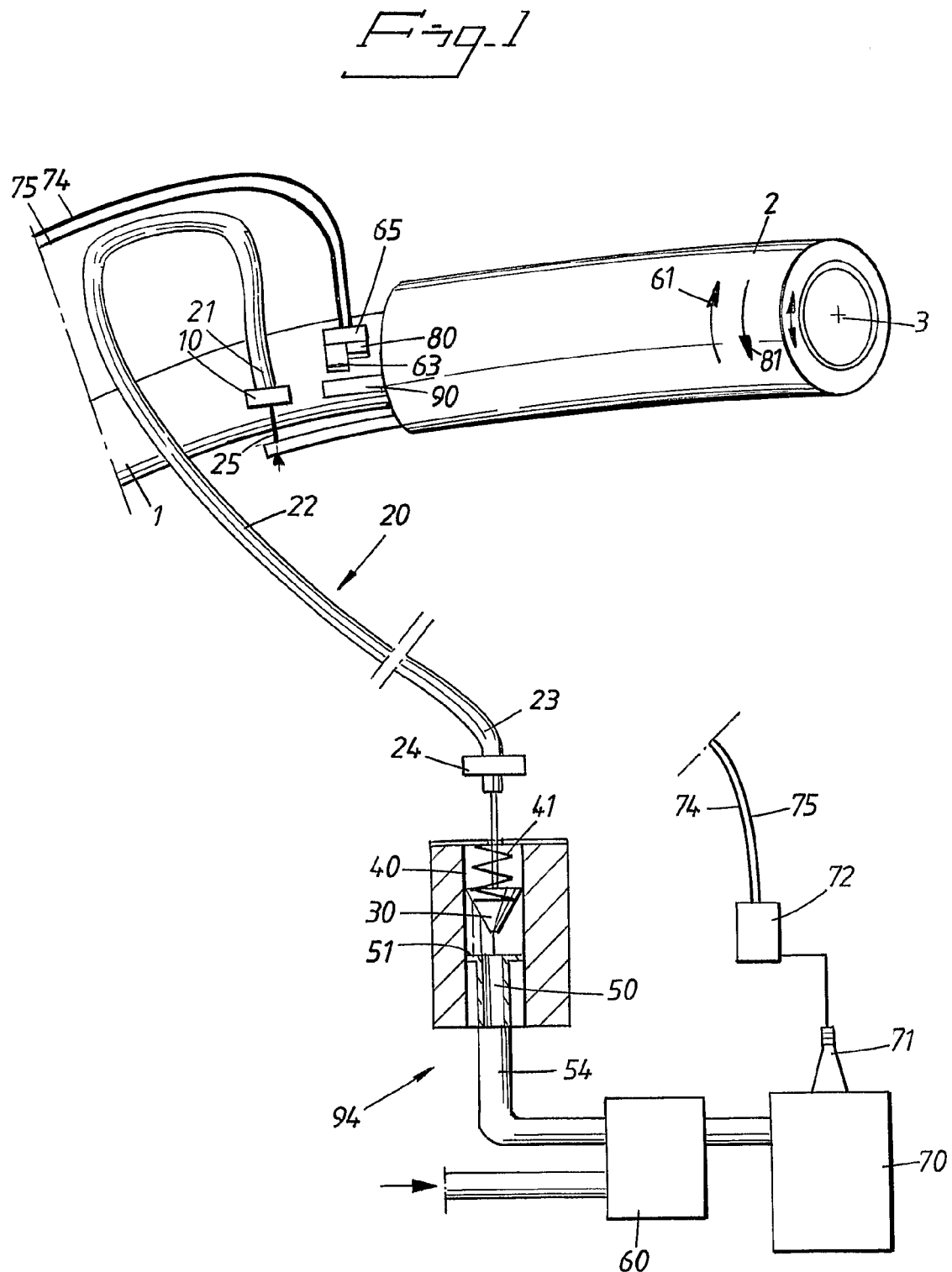
FIG. 1 illustrates diagrammatically the right-hand end part of a control rod for a motorcycle.

As shown, a handle 2 is mounted for rotation about the axis 3 of the rod 1. One end 21 of the sheath 22 of a Bowden cable 20 is anchored to the rod 1 by means of a fitting 10 and the wire 25 of the Bowden cable is connected to the handle 2 in a manner that will enable the wire 25 to be withdrawn from and pressed into the sheath 22 respectively in response to rotation of the handle 2. The other end 23 of the sheath 22 is anchored, for instance, to the frame of the motorcycle by means of a fitting 24 and the end of the wire is coupled to a valve body 30 which is guided in a channel 40 and biased towards its one end position by means of a spring 41. A fuel duct 50 has a seat 51 whose size can be changed by varying the distance of the valve body 30 from the seat 51. The flow of fuel through the seat 51 is led, via a line 51, to a device 60 in which the amount of fuel prevailing at that time is mixed with air of combustion and then delivered to an engine 70 in which the fuel-air mixture is combusted with the aid of a spark plug 71 to which electric impulses are delivered from an ignition system 72 in a known manner. The ignition system 72 includes a current carrying circuit which, as shown, includes 2 conductors 74, 75 which are mutually connected to a switch 80, this switch normally being closed such as to permit the supply of high tension electric pulses to the spark plug 71.

The handle 20 of the illustrated embodiment has an arm 90 which when the handle is turned in the direction 61 will abut a yieldable abutment body 63 that is carried by the rod 1 via a support 65 when the engine carburator 94 provides an engine idling state. The abutment body 63 may consist of rubber so as to provide pre-determined compression when the handle 2 is further rotated in the direction 61 such that when exerting a pre-determined torque on the handle 2 in the rotational direction 61, the handle arm 90 is able to come into contact with the switch 80, which is also supported by the support 65, as a result of deformation of the abutment body 63. The switch 80 is hereby re-set such as to shut down the ignition system 72 temporarily as a result of the engine stopping. The switch 80 may be of the kind that remains open when actuated, so as to require the switch 80 to be re-set in a separate operation after having switched off the ignition system 72 temporarily.

Figure 2:
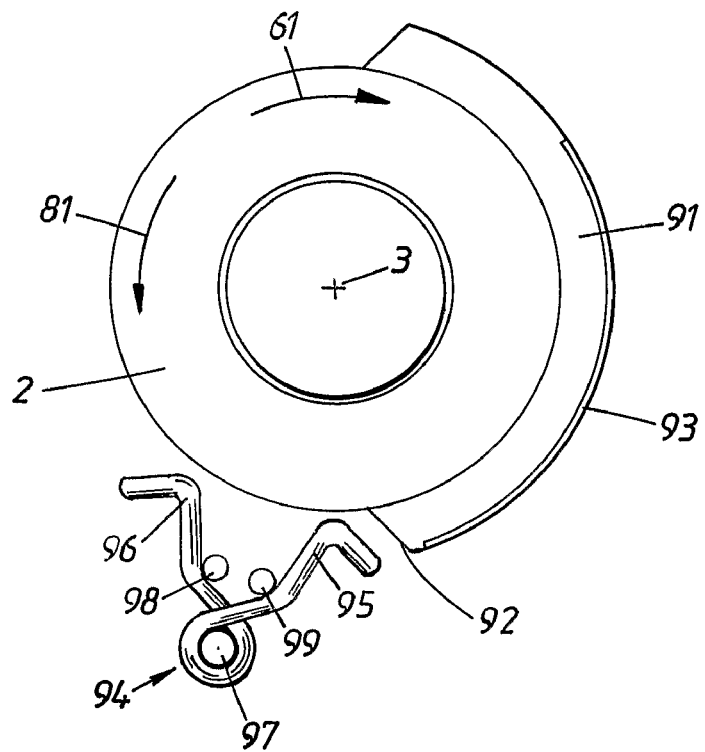
FIG. 2 is a diagrammatic illustration of a modified embodiment of the invention.
Figure 3:
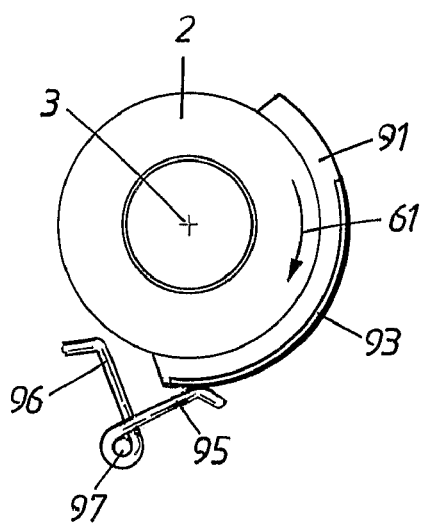
FIGS. 3 and 4 illustrate the inventive subject of FIG. 2 in two different working positions.
Figure 4:
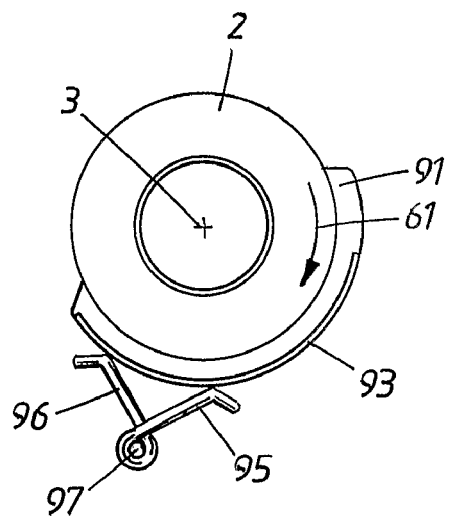

FIG. 2 illustrates an embodiment in which the rotatable handle 2 has a cam 91 whose outer surface is located at a generally constant radial distance from the rotational axis of the handle, externally of the handle perimeter. The cam 91 has a sloping end ramp 92 which lies upstream of the direction of rotation 61 of the handle and which converges with the handle 2 in said direction 61. As shown, a spring element 94 is mounted in the movement path of the cam 91, such that one end 95 of the spring element is contacted by the ramp 92 upon movement of the cam 91 in the direction 61. The spring element preferably has two arms and is conveniently supported at a midway portion for pivotal movement in a plane normal to the axis 3, wherein the arms 95, 96 of the spring element extend generally in mutually opposite directions in the direction of the handle perimeter. When the handle/cam 91 rotates in the direction 61, the ramp 92 will first meet the first spring arm 95, which extends to the ramp from the spring support 97 generally in the direction of the handle perimeter, wherewith the arm 95 is deflected/bent upwards in a radial direction. The first spring arm 95 can thus be considered to correspond to the resilient abutment body 63 described above with reference to FIG. 1.

When the first spring arm has glided up on the outer perimeter surface on the cam 91 said arm will come into electrical contact with an outer cam part 93 that extends along the cam 91 and is in electrically conductive contact with the current path through which current is delivered to the ignition system 92. The spring arm 95 is electrically conductive and is in electrically conductive contact with the carrier element 97 of the spring element, said carrier element being earthed so that current to the ignition system 72 will be earthed when the outer end part of the first spring arm 95 runs up onto the outer perimeter surface 93 of the cam 91. Upon continued rotation of the handle 2 in the direction 61, the second spring arm 96, which is generally directed away from the spring bearing 97 in the direction 61, will also glide up along the ramp 92 and be bent out so as to lie against the outer perimeter surface 93 of the ramp 91. As a result, the spring element 94 is subjected to an additional bending load so as to increase the contact pressure of both arms 95, 96 against the cam surface 93. This causes the friction between the arms 95, 96 and the outer perimeter of the cam to increase so that the handle will tend to fasten in this position of rotation. This is a favourable condition, since there is less risk of the handle being returned unintentionally in a handle-direction 81 towards full engine power and therewith repeat the risk of current being supplied to the ignition system 72.

The spring element 94 may be a helical spring whose helically wound central part is fitted on an earthed or grounded post 97, wherewith the helical spring has two spring arms 95, 96 which are directed generally opposite to one another in the direction of the handle perimeter. The arms 95, 96 of the spring element may support against support elements 98, 99 towards which the arms are biased. The supports 98 are shown located between respective arms and the handle 2. The positions of the support elements 98, 99 are chosen to impart to the spring arms a given bias in a direction towards the handle axis 3.

Alternatively, the spring element 94 may have the form of a leaf spring which has in its midway region an opening that receives the bearing post 97. Rotation of the spring element 94 about the bearing post 97 ensures good electric contact between the spring element 94 and the post, even in the presence of moisture and dirt. Because the first aim-end 95 slides along the electrically conductive surface 93 of the ramp, good electrical contact is also achieved therebetween, even in the absence of moisture and dirt.

It will be understood that the person of normal skill in this art will be able to modify the inventive device in various ways within the scope of the accompanying claims.

The invention claimed is:

1. A control device for a vehicle that includes an engine that has an electric fuel ignition system, a switch which is adapted to cut-out the engine ignition system temporarily when activated, means for setting the amount of fuel delivered to the engine during operation, and a handle which is rotatable about an axis and which is intended to be gripped and turned by one of the driver's hands, wherein the driver of the vehicle controls the setting means via a transmission by turning the handle to a position which is defined by contact of the handle with the yieldable abutment means and which represents an engine idling position, and a second position which represents full engine power, wherein the abutment means is adapted to yield to a pre-determined force thereon exerted via the handle, whereby the handle actuates the switch.

2. A device according to claim 1, wherein abutment means has the form of a spring arm whose one end is placed in the path of movement of a cam carried by the handle, wherein the cam includes a ramp which extends on the cam towards the engine idling position and which deflects said end of said spring arm so that said arm pass beyond this position.

3. A device according to claim 2, wherein the arm end deflected by the ramp extends up on a caming surface on the cam extending in the direction of the handle perimeter, said cam surface conducting current to the engine ignition system; and in that the spring arm is earthed so as to cut-out the ignition system temporarily.

4. A device according to claim 2, wherein the first spring arm is carried by a spring element that includes a second spring arm which is generally opposite to first spring arm in the direction of the handle perimeter, wherein the free end of the first spring arm extends in the rotational direction of the handle in which full engine power is achieved.

5. A device according to claim 4, wherein the end part of the second spring arm is also arranged to be deflected by the ramp and the cam upon continued rotation of the ramp-end of the cam connected to the handle beyond the end of the first spring arm when turning the handle in a direction that is opposite to the direction in which full engine power is achieved.

6. A device according to claim 3, wherein the spring arms are end parts of a spring element that is pivotally mounted on an earthed pivot means.

7. A device according to claim 2, wherein the arms of the spring element are biased so as to bend outwardly towards the handle axis and towards respective abutments which hold the arms of the spring element in corresponding chosen directions whilst being unaffected by the cam and its ramp.

8. A device according to claim 3, wherein the first spring arm is carried by a spring element that includes a second spring arm which is generally opposite to first spring arm in the direction of the handle perimeter, wherein the free end of the first spring arm extends in the rotational direction of the handle in which full engine power is achieved.

* * * * *